Nov. 18, 1924.
J. R. MONTGOMERY
1,516,235
BED FOR TOURING CAR BODIES
Filed Oct. 25, 1922
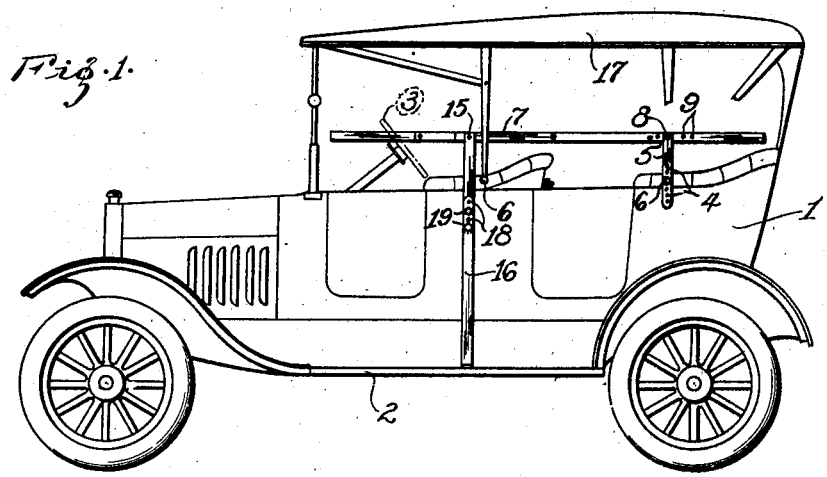
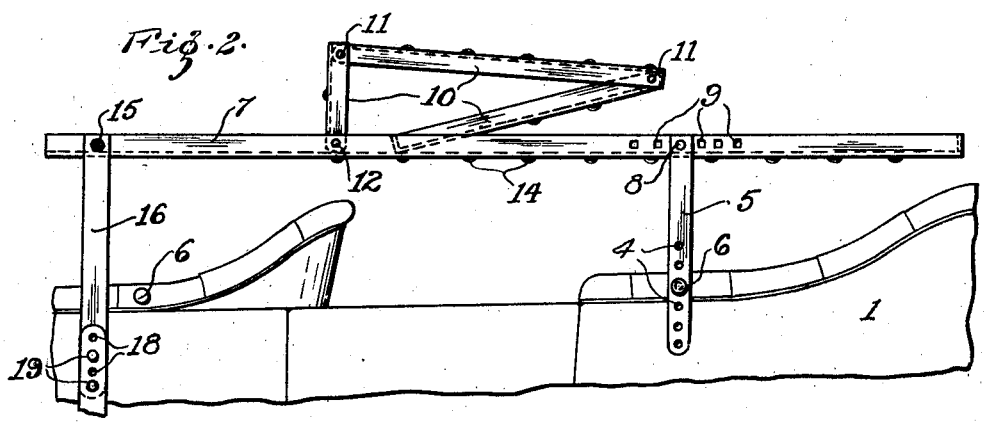
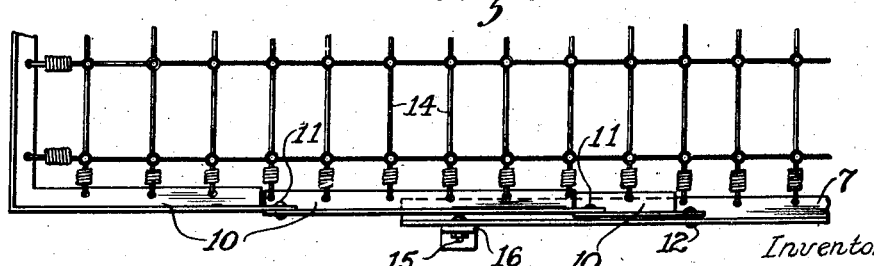
Inventor
James R. Montgomery
By John C. Higdon
Attorney Patented Nov. 18, 1924.

1,516,235

UNITED STATES PATENT OFFICE.

JAMES R. MONTGOMERY, OF ST. LOUIS, MISSOURI.

BED FOR TOURING-CAR BODIES.

Application filed October 25, 1922. Serial No. 596,760.

*To all whom it may concern:*

Be it known that I, JAMES R. MONTGOMERY, a citizen of the United States, residing at St. Louis, in the State of Missouri, have invented certain new and useful Improvements in Beds for Touring-Car Bodies, of which the following is a specification containing a full, clear, and exact description, reference being had to the accompanying drawing, forming a part hereof.

My invention consists in the novel construction and combination of parts hereinafter particularly described and distinctly claimed.

The object of my invention is to provide an improved folding-bed, especially adapted for use on the touring-car bodies of Ford automobiles, but which bed may be used on the touring-car bodies of larger cars, by tourists when on touring or camping trips, and which bed when not in use may be folded into a compact bundle and placed on the running-board of the automobile until again required for use. Said bed will be simple in construction, durable, and of low cost to manufacture.

In the drawing:—

Fig. 1 is a side-view of an automobile showing my invention in use thereon.

Fig. 2 is an enlarged side-elevation of a portion of an automobile body having my invention applied thereto, in a partly folded position, and Fig. 3 is a fragmentary top-plan view showing a portion of the bed in its unfolded position ready for use.

The numeral 1 designates the automobile body to which my invention is attached, 2 the running-board, and 3 the steering-wheel thereof.

To attach my improved bed to the touring-car body 1 of the automobile, the top 17 is detached from the usual top supporting-brackets, and folded up in the usual manner, by removing the usual top supporting bracket-nuts 6.

The bed is then placed in position on the body 1 by inserting the top supporting-brackets through one of a series of holes or perforations 4 in opposite supporting-standards 5, and is secured in place thereon by the said top supporting-bracket-nuts 6.

The said supporting-standards 5 are pivotally mounted to a bed spring-frame 7 near the rear end thereof by means of bolts 8 inserted through one of a series of holes or perforations 9. Said holes or perforations 9 also allow the bed to be moved either forward or backward, as the case may be, in order that the bed may be adjusted to fit touring car-bodies of various lengths..

A plurality of folding-sections 10 are pivotally connected together by means of bolts or rivets 11, and are pivotally mounted to the said bed spring-frame 7 at a point adjacent the forward end thereof by means of bolts or rivets 12.

The said bed spring-frame 7 and the said folding-sections have connected thereto the usual wire or other form of bed-spring 14. The said bed spring-frame 7 and the said folding-sections 10 are preferably made of light-weight angle-iron, but I do not limit myself to this form of material, as other forms of material well-known to manufacturers of beds may be used in its construction.

Pivotally mounted to the forward end of the bed spring-frame 7, by means of bolts or rivets 15, are opposite adjustable supporting-standards 16 which are adapted to rest on the running-board 2 of the automobile, and which are constructed so they may be lengthened or shortened to raise or lower the bed for proper adjustment to the said body 1.

After the bed has been installed or attached to the automobile-body 1, and the proper adjustments have been made, the steering-wheel 3 should be removed to allow the bed to be unfolded the full length, as shown in Fig. 1. The top 17 is then replaced and raised up and will afford protection and shelter from storms, wind, or rain which may come up during the night, and the usual side-curtains or storm-curtains (not shown) may also be brought into use in the usual manner.

To raise or lower the forward or front end of the bed, I have provided the said supporting-standards 16 with a series of holes or perforations 18 through which are passed bolts 19, and to raise or lower the rear end of the bed, the said top supporting-brackets are inserted in the desired hole or perforation 4 in the said supporting-standard 5.

While I have illustrated certain details of construction which I deemed to be particularly effective, and have illustrated a construction which is very cheap to make and easy to be put up, I do not wish to be limited to these details, as it is obvious that many changes might be made therein without departing from the spirit or scope of my invention.

Having thus described my invention, what I claim as new and desire to secure by Letters-Patent is:—

A folding-bed adapted to be used on the touring car-bodies of automobiles, comprising front vertically adjustable supporting-standards of sufficient length to extend down to and rest upon the running-boards of automobiles; rear vertically adjustable supporting-standards; a bed spring-frame carried by said front and rear supporting-standards and adjustable thereon either upward or downward or forward or backward, to fit touring car-bodies of different sized automobiles; a plurality of folding-sections hinged together and pivotally mounted upon said bed-spring-frame, and bed springs connected to the said bed spring-frame and to the frames of the said folding-sections.

In testimony whereof, I have signed my name to this specification in presence of two subscribing witnesses.

JAMES R. MONTGOMERY.

Witnesses:
MAY S. MONTGOMERY,
JOHN C. HIGDON.